(12) United States Patent
Inoue

(10) Patent No.: US 8,312,791 B2
(45) Date of Patent: Nov. 20, 2012

(54) BICYCLE PEDAL

(75) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 536 days.

(21) Appl. No.: 12/578,930

(22) Filed: Oct. 14, 2009

(65) Prior Publication Data
US 2011/0083530 A1   Apr. 14, 2011

(51) Int. Cl.
*B62M 3/08* (2006.01)
(52) U.S. Cl. .................. 74/594.6; 74/594.4; 36/131
(58) Field of Classification Search .............. 74/594.4, 74/594.6; 36/131; *B62M 3/08*
See application file for complete search history.

(56) References Cited

U.S. PATENT DOCUMENTS

| | | | |
|---|---|---|---|
| 4,969,375 A * | 11/1990 | v.d.Osten-Sacken et al. | 74/594.6 |
| 5,003,841 A | 4/1991 | Nagano | |
| 5,115,692 A * | 5/1992 | Nagano | 74/594.4 |
| 5,505,111 A * | 4/1996 | Nagano | 74/594.6 |
| 5,685,202 A * | 11/1997 | Chen | 74/594.6 |
| 6,014,914 A | 1/2000 | Ueda | |
| 6,446,529 B1 | 9/2002 | Tanak | |
| 7,013,755 B2 | 3/2006 | Muraoka | |

FOREIGN PATENT DOCUMENTS

| | | |
|---|---|---|
| CH | 300238 | 7/1954 |
| CN | 2289749 Y | 9/1998 |
| DE | 203 20 681 U1 | 1/2005 |
| FR | 833569 | 10/1938 |

OTHER PUBLICATIONS

European Search Report of corresponding EP Application No. 10 17 3685.8 dated Feb. 21, 2011.

* cited by examiner

*Primary Examiner* — Richard W Ridley
*Assistant Examiner* — Thomas Diaz
(74) *Attorney, Agent, or Firm* — Global IP Counselors, LLP

(57) ABSTRACT

A bicycle pedal has a pedal spindle, a pedal body and a step-in cleat engagement structure. The pedal body includes a tubular mounting portion rotatably mounted on the pedal spindle. The tubular mounting portion includes a center tube section that has a widthwise dimension and a lengthwise dimension as measured from the center spindle axis to an outside surface of the center tube section along reference planes that are substantially perpendicular to each other. The widthwise dimension is substantially perpendicular to a cleat pedaling force direction applied to the pedal spindle, as viewed along in a direction of the center spindle axis. The outside surface of the center tube section has an overall transverse cross sectional shape that includes a generally convex arc that extends a majority of the outside surface of the center tube section on a side of the reference plane that faces the cleat engagement structure.

12 Claims, 8 Drawing Sheets

BICYCLE PEDAL

BACKGROUND OF THE INVENTION

1. Field of the Invention

This invention generally relates to a bicycle pedal. More specifically, the present invention relates to a bicycle pedal that is designed to more easily permit mud to pass through its pedal body.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the bicycle pedal.

Pedals are an essential bicycle component in that they transfer cycling power to the bicycle's drive train. Different styles of bicycles utilize different bicycle pedal styles that are designed for a specific purpose such as for pleasure, off road biking, road racing, etc. In recent years, one particular type of bicycle pedal, which is gaining more popularity, is the step-in or clipless pedal, which releasably engages a cleat secured to the sole of a rider's shoe. In other words, cleats are attached to the sole of specially-designed cycling shoes. The cleats lock the rider's feet into the pedals. The step-in pedal has a pedal spindle that can be mounted on the crank of a bicycle, a pedal body that is rotatably supported on this pedal spindle, and a cleat engagement mechanism that clamps onto the cleat. In an off road bicycle pedal, both sides of the pedal body is provided with a cleat engagement mechanism for engaging a cleat. Road racing pedals typically only have a single cleat engagement mechanism on one side of the pedal body. In either case, in this type of bicycle pedal, the rider steps onto the pedal and the cleat engagement mechanism automatically grips on to the cleat secured to the bottom of the rider's shoe.

More specifically, when attaching the rider's shoe to the step-in pedal via the cleat, the rider moves the shoe obliquely downwardly and forwardly relative to the pedal body such that the front end of the cleat engages a front hook or cleat engagement member of the pedal body. Once the front end of the cleat is engaged with the front hook of the pedal body, the rider places the rear end of the cleat in contact with a guide portion of the rear hook or cleat engagement member of the pedal body. In this position, the rider presses the shoe downwardly against the step-in pedal to cause the rear hook or cleat engagement member to initially pivot rearwardly against the force of a spring to move the rear hook or cleat engagement member to a cleat releasing position. The rear end of the cleat then enters a position opposite a back face of the rear hook or cleat engagement member. Then, the rear hook or cleat engagement member returns under the force of a biasing member or spring so that the rear hook or cleat engagement member engages the rear end of the cleat. This engagement fixes the rider's shoe to the step-in pedal via the cleat.

When releasing the shoe from the step-in pedal, the rider will typically turn the shoe about an axis perpendicular or approximately perpendicular to the tread of the step-in pedal, using the front end of the cleat as a pivoting point. As a result of this pivoting action, the rear hook or cleat engagement member is pivoted rearward against the force of the spring to a cleat releasing position to release the shoe.

Most step-in pedals are quite small and can have several moving parts. As a result of these types of pedal designs, the moving parts often can become clogged with dirt or mud in wet and/or muddy riding conditions. Dirt or mud can affect the release of the cleat from the step-in pedal, or affect insertion of the cleat into the cleat engagement members of the step-in pedal. This can especially be a problem if the dirt or mud dries within the moving parts of the step-in pedal. This is usually more of a problem for off-road type bicycle riding. Additionally, in recent years, downhill races, dual slalom races, cross-country races and other such off-road races for mountain bikes and BMX (bicycle motor-cross) have been widely staged. In any of these off-road type races, unlike in road racing, the riders traverse an unpaved track or course. Furthermore, with this type of off-road racing, the foot must be repeatedly taken off the pedal during cornering and replaced on the pedal after the corner has been exited. Similarly, in recreational off-road riding, the rider's shoes must often be repeatedly removed and reattached to the bicycle pedals depending on the riding situation. Unfortunately, since off-road riding is performed on unpaved roads, mud clings to the pedals and tends to clog the cleat engagement members. Once the cleat engagement members become clogged with mud, the cleat cannot be engaged in the cleat engagement members and the shoe cannot be attached to the pedal. Moreover, the mud often clogs the biasing mechanism such that the cleat engagement members may not operate properly. One attempt to provide a pedal that is designed to more easily permit mud to pass through its pedal body is disclosed in U.S. Pat. No. 6,446,529, which is assigned to Shimano, Inc.

In view of the above, it will be apparent to those skilled in the art from this disclosure that there exists a need for an improved bicycle pedal. This invention addresses this need in the art as well as other needs, which will become apparent to those skilled in the art from this disclosure.

SUMMARY OF THE INVENTION

One object of the present invention is to provide a bicycle pedal, which limits or prevents dirt, mud, or the like, from accumulating on the pedal body.

Another object of the present invention is to provide a bicycle pedal with an enlarged unobstructed passageway arranged between one of the cleat engagement members and the hub body that allows dirt, mud, or the like, to be extracted from the bicycle pedal body.

The foregoing objects can basically be attained by providing a bicycle pedal that mainly comprises a pedal spindle and a pedal body. The pedal spindle has a center spindle axis. The pedal body includes a tubular mounting portion rotatably mounted on the pedal spindle, a first shoe supporting part extending in a first direction from the tubular mounting portion and a second shoe supporting part extending in a second direction from the tubular mounting portion. The first and second shoe supporting parts includes first and second center portions, respectively. The first and second center portions are spaced from the tubular mounting portion by first and second through openings. The first center portion includes a first cleat engagement member supported by the first shoe supporting part, the second center portion includes a second cleat engagement member supported by the second shoe supporting part. The first and second cleat engagement members form a step-in cleat engagement structure. The tubular mounting portion includes a center tube section partially defining the first and second through openings with respect to the first and second center portions of the first and second shoe supporting parts. The center tube section has a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis. The center tube section has a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension. The outside surface of the center tube section has an overall transverse cross sectional shape that includes a first generally convex arc disposed on a first side of the second reference plane and a second generally convex arc disposed on a second side of the second reference plane as viewed along in a direction of the center spindle axis. The first generally convex arc extends a majority of the outside surface of the center tube section on the first side of the second reference plane. The second generally convex arc extends a majority of the outside surface of the center tube section on the second side of the second reference plane.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
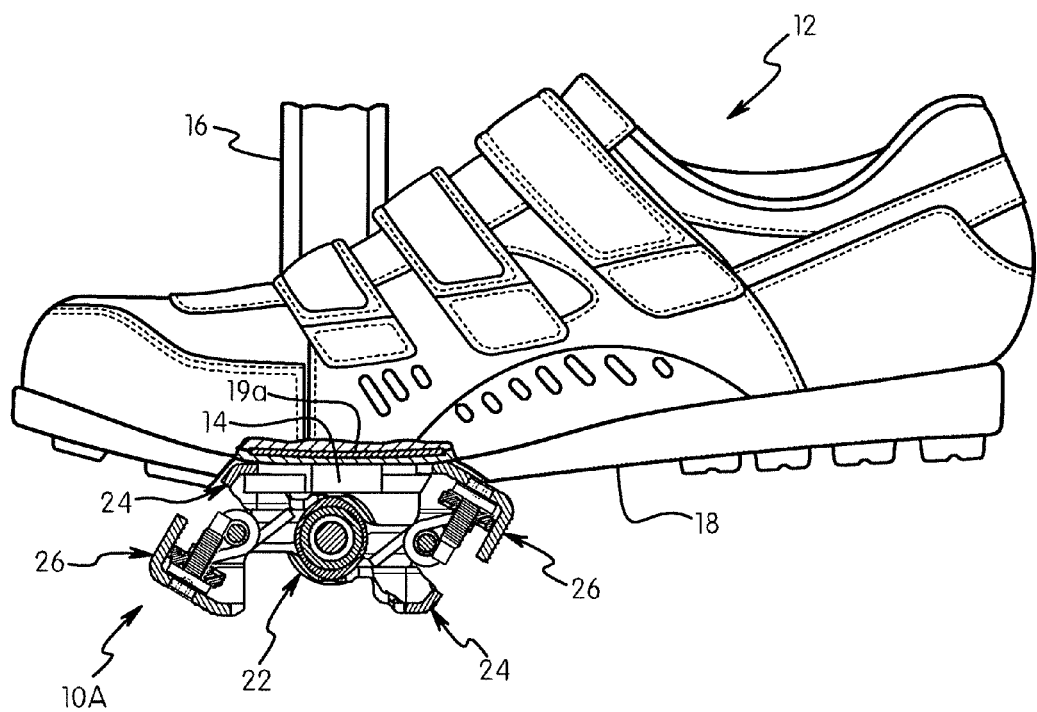
FIG. 1 is an outside elevational view of a bicycle shoe attached to a left bicycle step-in pedal (shown in cross section) via a cleat of the bicycle shoe in accordance with a first illustrated embodiment.
Figure 2:
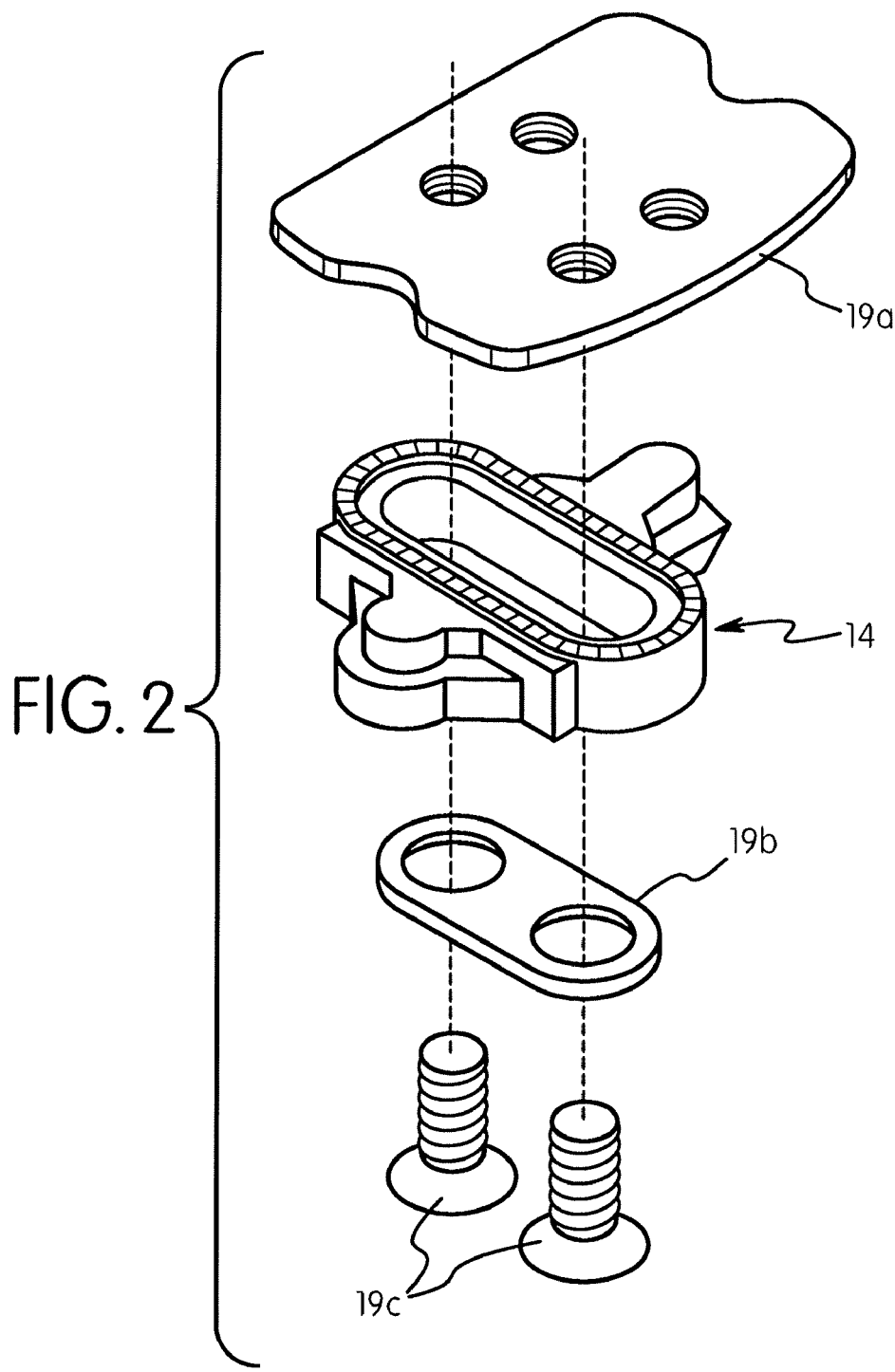
FIG. 2 is an exploded perspective view of the cleat assembly for attaching the cleat to the bicycle shoe illustrated in FIG. 1.
Figure 3:
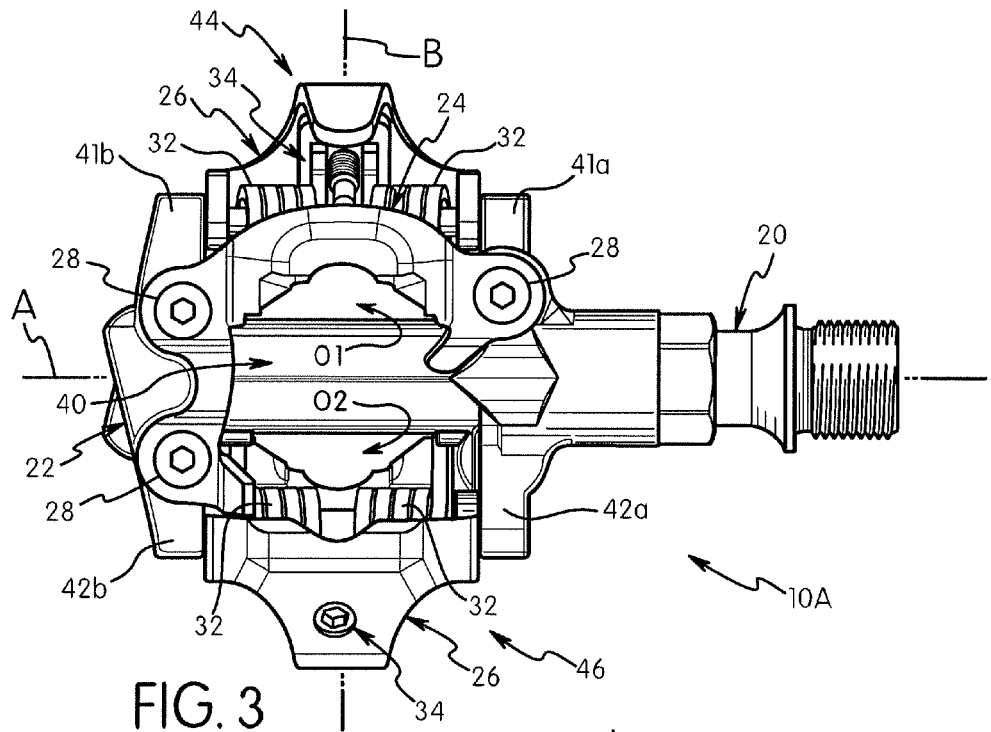
FIG. 3 is a top plan view of the left bicycle pedal illustrated in FIG. 1 in accordance with the first embodiment.

Referring initially to FIGS. 1 to 3, a bicycle pedal 10A is illustrated in accordance with one preferred embodiment. The bicycle pedal 10A is a clipless or step-in pedal that can be used with a bicycle shoe 12 having a cleat 14 coupled thereto. The bicycle pedal 10A is especially designed for use with off-road bicycles as opposed to use with a road bicycle. Of course, the bicycle pedal 10A can be used on a road bicycle or any type of bicycle if needed and/or desired. As seen in FIG. 1, the bicycle pedal 10A is fixedly coupled to a bicycle crank arm 16 of a bicycle for rotation therewith, while the cleat 14 is fixedly coupled to a bottom surface of a sole 18 of the shoe 12. The cleat 14 is part of a cleat assembly that includes a cleat nut plate 19a, a cleat fixing plate 19b and a pair of fixing bolts 19c. The illustrated cleat assembly (i.e., the parts 14, 19a, 19b and 19c) is conventional arrangement, and thus, the cleat assembly (i.e., the parts 14, 19a, 19b and 19c) will not be discussed in detail herein.

Figure 4:
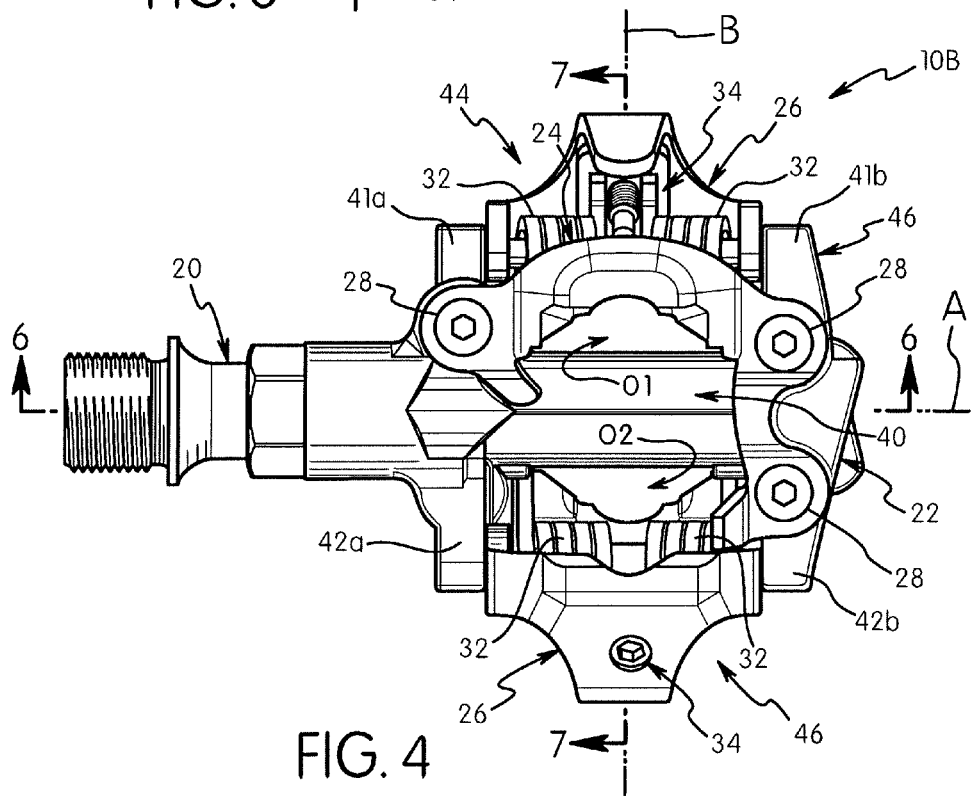
FIG. 4 is a top plan view of a right bicycle pedal that is a mirror image of the left bicycle pedal illustrated in FIGS. 1 and 3 in accordance with the first embodiment.

As seen in FIGS. 2 to 7, the bicycle pedal 10A, illustrated in FIGS. 2 to 4, is a left side bicycle pedal, while a right side bicycle pedal 10B is illustrated in FIGS. 5 to 10. Each of the bicycle pedals 10A and 10B mainly includes a pedal spindle or axle 20, a pedal body 22, a pair of front cleat engagement members 24 and a pair of rear cleat engagement members 26. Likewise, as seen in FIGS. 5 to 11, the bicycle pedal 10B also mainly includes the pedal spindle or axle 20, the pedal body 22, the front cleat engagement members 24 and the rear cleat engagement members 26. Both the pedals 10A and 10B are designed to have the pedal body 22 with a high degree of stiffness, while at the same time designed to permit mud easily drop down from the pedal body 22 between the front and rear cleat engagement members 24 and 26. Thus, the same pedals 10A and 10B are provided on the right and left sides of the bicycle, except that the right side pedal 10B is a mirror image of the left side pedal 10A, and the right-side (usually the drive-side) pedal spindle 20 is right-hand threaded, and the left-side (usually the non-drive-side) pedal spindle 20 is left-hand (reverse) threaded to help prevent the pedals from becoming loose. Accordingly, for the sake of simplicity, the same reference numerals will be used for the same parts of the pedals 10A and 10B.

Figure 5:
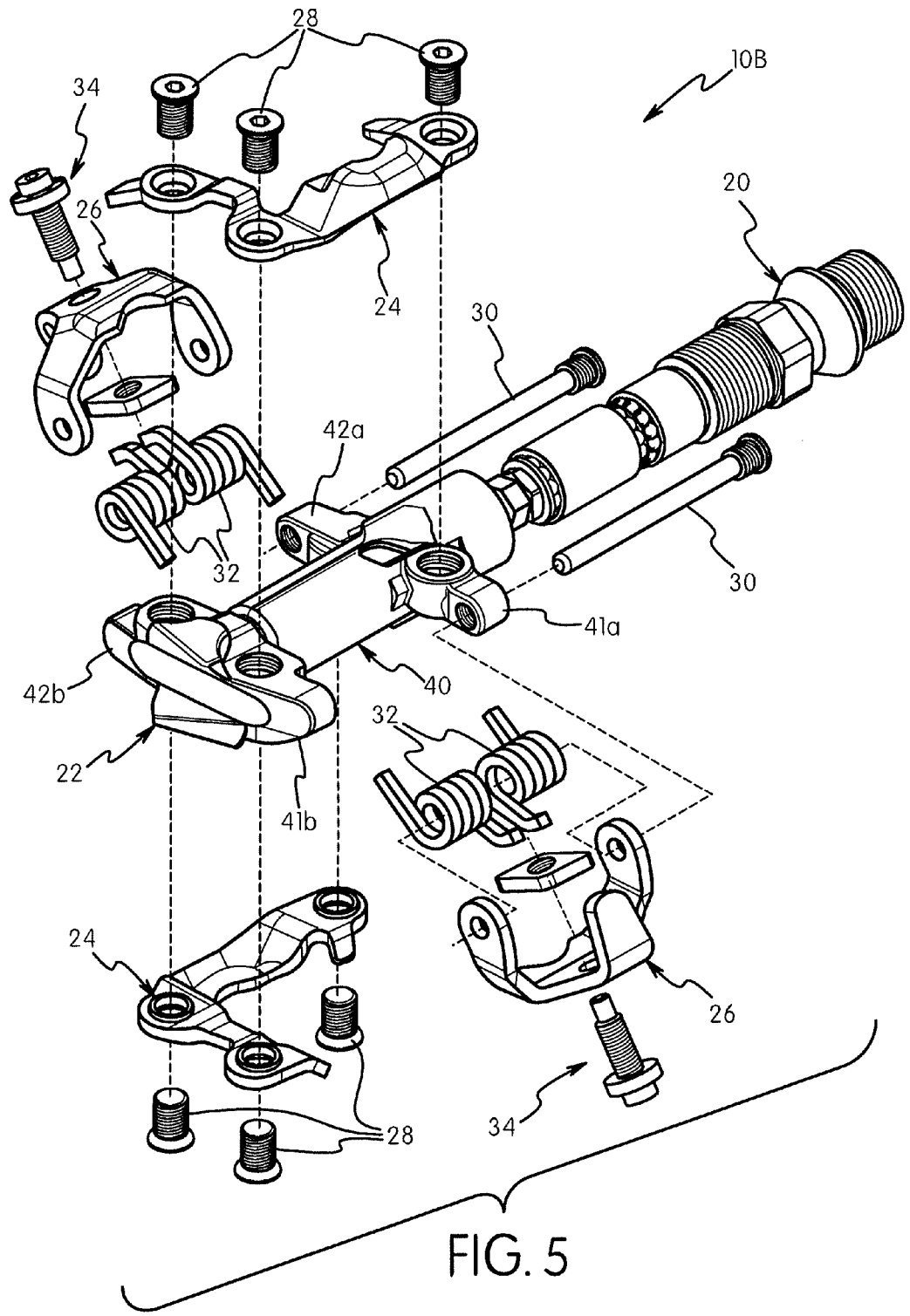
FIG. 5 is an exploded perspective view of the right bicycle pedal illustrated in FIG. 4 in accordance with the first embodiment.

Now, the bicycle pedal 10B will be discussed in more detail with reference to FIGS. 4 to 9. Of course, the description of the bicycle pedal 10B applies to the bicycle pedal 10A. The pedal spindle 20 is adapted to be threadedly coupled to the crank arm 16. The pedal body 22 is rotatably supported on the pedal spindle 20 for supporting a rider's foot. Each of the front cleat engagement members 24 is rigidly fixed to the pedal body 22 by a plurality (three) of attachment bolts 28. Each of the rear cleat engagement members 26 is pivotally coupled to the pedal body 22 by a pivot pin 30, with a biasing member 32 being mounted on each of the pivot pins 30 to bias the rear cleat engagement members 26, respectively, to a rest (cleat engagement) position. As seen in FIGS. 4, 5 and 7, each of the biasing members 32 is preferably formed by a pair of torsion springs that are mirror images of each other. A tension adjusting mechanism 34 is provided between each of the rear cleat engagement members 26 and the corresponding one of the biasing members 32 for adjusting the spring force applied to the rear cleat engagement members 26.

The cleat 14 is designed to releasably couple the sole 18 of the shoe 12 to the bicycle pedal 10B using one of the front cleat engagement members 24 and one of the rear cleat engagement members 26 at the same time in a conventional manner. Specifically, the cleat 14 is engaged with the bicycle pedal 10B by pressing the cleat 14 into the bicycle pedal 10B with a forward and downward motion. This releasably locks the cleat 14 to the bicycle pedal 10B via one of the sets of cleat engagement members 24 and 26. The cleat 14 can be released from the bicycle pedal 10B by twisting the heel of the shoe 12 to the outside of the bicycle pedal 10B.

Generally speaking, as best seen in FIG. 7, the pedal spindle 20 has a center spindle axis A, with a first reference plane P1 that passes through the center spindle axis A, and a second reference plane P2 that is perpendicular to the first reference plane P1 and that also passes through the center spindle axis A. The first reference plane P1 is substantially perpendicular to a cleat pedaling force direction applied to the pedal spindle 20, as viewed along in a direction of the center spindle axis A, by the rider via the cleat 14 during pedaling by the rider. Thus, the first reference plane P1 extends in a front to aft direction of the bicycle pedal 10B, while the second reference plane P2 extends in a direction substantially parallel to the cleat pedaling force direction of the bicycle pedal 10B. This illustrated embodiment, the cleat pedaling force direction lies in the second reference plane P2. However, the cleat pedaling force direction does not need to be exactly perpendicular to the first reference plane P1 or exactly parallel to the second reference plane P2. Rather, the cleat pedaling force direction is substantially (±10°) perpendicular to the first reference plane P1 or substantially (±10°) parallel to the second reference plane P2. More preferably, the cleat pedaling force direction is ±5° from being perpendicular to the first reference plane P1 or from being parallel to the second reference plane P2.

In this illustrated embodiment, the first reference plane P1 basically bisects the bicycle pedal 10B into a first pedaling side S1 and a second pedaling side S2. The first pedaling side S1 includes one of the front cleat engagement members 24 and one of the rear cleat engagement members 26 that cooperate together to form a first step-in cleat engagement structure. The second pedaling side S2 includes the other one of the front cleat engagement members 24 and the other one of the rear cleat engagement members 26 that cooperate together to form a second step-in cleat engagement structure. This arrangement allows the rider's cleat to be engaged with either side of the pedal 10B.

Figure 6:
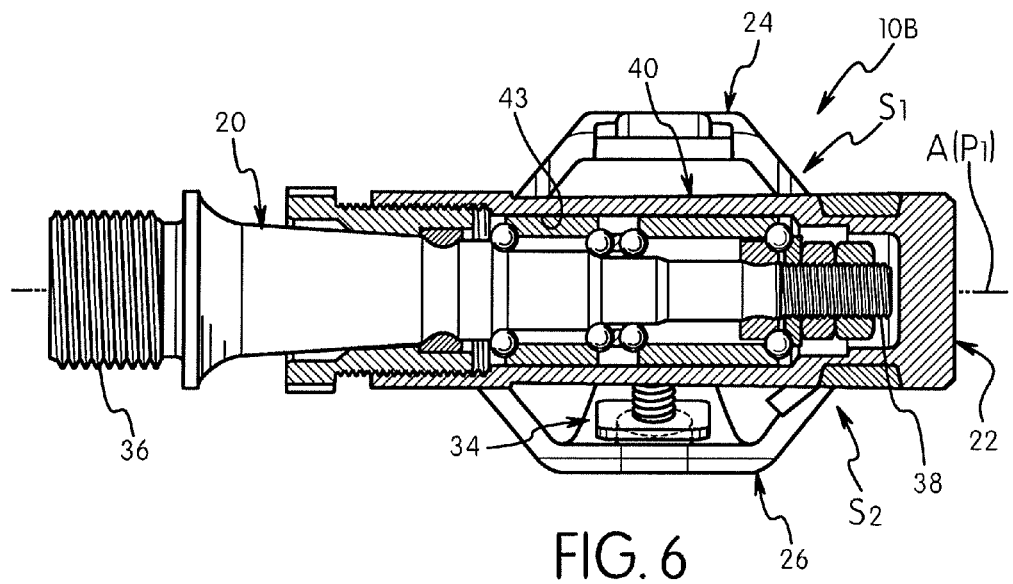
FIG. 6 is a transverse cross sectional view of the right bicycle pedal illustrated in FIGS. 5 and 6 as seen along section line 6-6 of FIG. 4.
Figure 7:
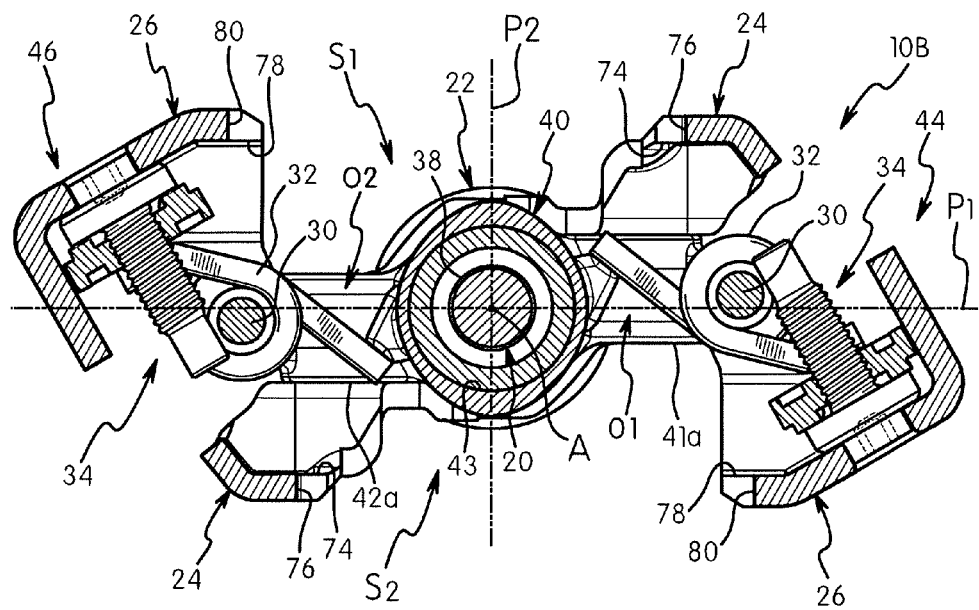
FIG. 7 is a longitudinal cross sectional view of the right bicycle pedal illustrated in FIGS. 4 to 6 as seen along section line 7-7 of FIG. 4.

Referring now to FIGS. 6 and 7, the pedal spindle 20 is preferably a multi-step spindle having several stepped portions. The pedal spindle 20 has a first end 36 with a thread formed thereon for threadedly coupling the pedal 10 to the crank 16 in a conventional manner. The pedal spindle 20 has a second end 38 that rotatably supports the pedal body 22 in a conventional manner. The pedal body 22 can freely rotate about the center spindle axis A of the pedal spindle 20 with the center spindle axis A extending between the first and second ends 36 and 38. Since the pedal spindle 20 is relatively conventional and its specific construction is not critical to the present invention, the construction of the pedal spindle 20 will not be discussed or illustrated in detail herein.

Figure 8:
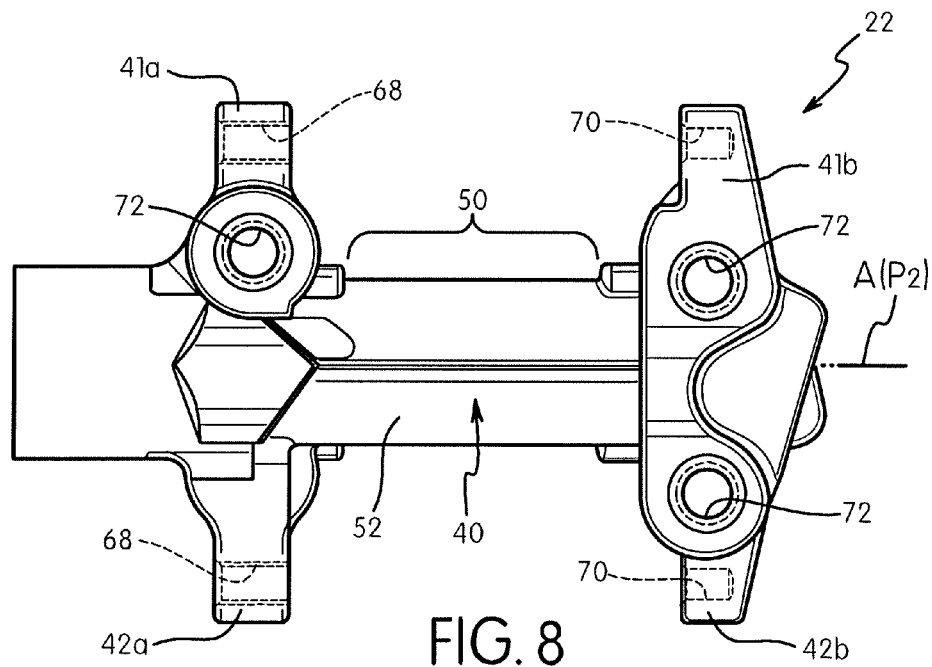
FIG. 8 is a top plan view of the pedal body for the right bicycle pedal illustrated in FIGS. 4 to 7.
Figure 9:
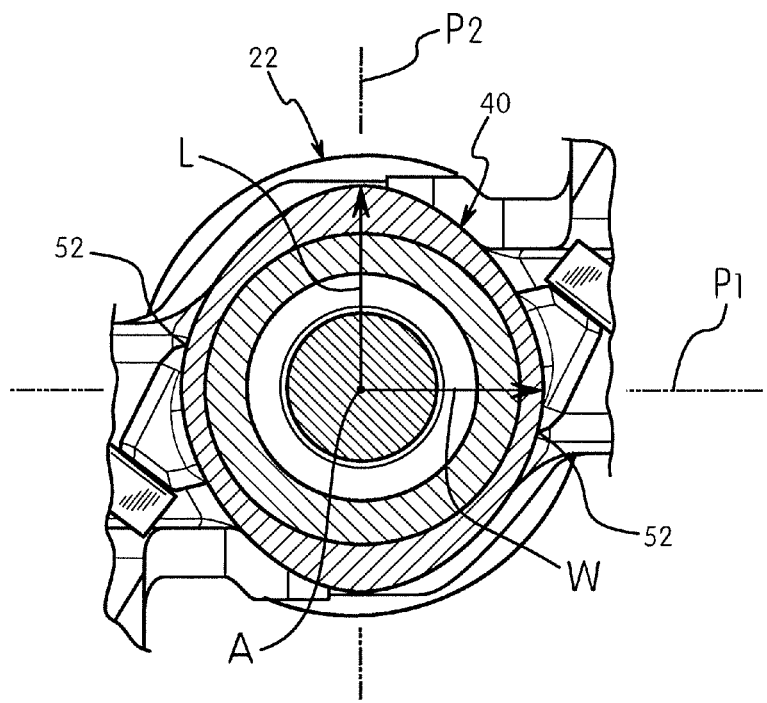
FIG. 9 is an enlarged, partial cross sectional view of the tubular mounting portion of the pedal body illustrated in FIGS. 4 to 8.

Referring to FIGS. 7-9, the pedal body 22 is preferably made of a lightweight metallic material, such as aluminum alloy. Depending on the orientation of the pedal body 20, one of the ends of the pedal body 22 is considered a front or first end, while the other end is considered a second or rear end.

The pedal body 22 is an H-shaped member. In particular, the pedal body 22 has a tubular mounting portion 40, a first inner side portion or flange 41a, a first outer side portion or flange 41b, a second inner side portion or flange 42a and a second outer side portion or flange 42b. The tubular mounting portion 40 has a bore 43 that rotatably receives the second end 38 of the pedal spindle 20 therein for rotation via bearings about the center spindle axis A.

As seen in FIG. 4, the pedal body 22 has a center longitudinal axis B extending between the first and second shoe supporting parts 44 and 46. The center longitudinal axis B is perpendicular to the center spindle axis A of the pedal spindle 20. Preferably, as can be determined from FIGS. 4 to 7, the first reference plane P1 passing through both the center spindle axis A and the center longitudinal axis B has a cleat receiving area formed on each side thereof. In other words, each cleat receiving area is formed by one of the front cleat engagement members 24 and one of the rear cleat engagement members 26 arranged on one side of the first reference plane P1 of the pedal body 22.

The first inner and outer side portions 41a and 41b with one of the sets of the front and rear cleat engagement members 24 and 26 form a first shoe supporting part 44 of the pedal body 22, while the second inner and outer side portions 42a and 42b with the other set of the front and rear cleat engagement members 24 and 26 form a second shoe supporting part 46 of the pedal body 22. The first shoe supporting part 44 extends in a first direction from the tubular mounting portion 40, while the second shoe supporting part 46 extends in a second direction from the tubular mounting portion 40. The first and second directions of the first and second shoe supporting parts 44 and 46 extend in substantially opposite directions with respect to the first reference plane P1. In this illustrated embodiment, one of the sets of the front and rear cleat engagement members 24 and 26 constitutes a first center portion of the first shoe supporting part, while the other set of the front and rear cleat engagement members 24 and 26 constitutes a second center portion of the second shoe supporting part 46. In other words, the first and second shoe supporting parts 44 and 46 includes the first and second center portions, respectively. The first and second center portions (i.e., the engagement members 24 and 26) are spaced from the tubular mounting portion 40 by first and second through openings O1 and O2.

Referring now to FIGS. 8 and 9, the tubular mounting portion 40 includes a center tube section 50 disposed between the side portions 41a, 41b, 42a and 42b of the pedal body 22. This center tube section 50 partially defines the first and second through openings O1 and O2 with respect to the first and second center portions of the first and second shoe supporting parts 44 and 46. The center tube section 50 has an outer surface 52 that extends the entire lateral width of the first and second through openings O1 and O2 of the bicycle pedal 10B as best seen in FIG. 5. In this illustrated embodiment, the outer surface 52 of the center tube section 50 has a uniform transverse cross sectional profile along its entire length as view in a direction along the center spindle axis A. In other words, the cross sectional profile of the outer surface 52 of the center tube section 50 is identical for each and every cross sectional slice of the center tube section 50 that aligns with the first and second through openings O1 and O2.

As best seen in FIG. 9, in this first embodiment, the center tube section 50 has a first radial or widthwise dimension W and a second radial or lengthwise dimension L. The widthwise dimension W is measured from the center spindle axis A to the outside surface 52 of the center tube section 50 along the first reference plane P1 that is perpendicular to the second reference plane P2 or substantially perpendicular to the cleat pedaling force direction applied to the pedal spindle 20, as viewed along in a direction of the center spindle axis 20. The lengthwise dimension L measured from the center spindle axis A to the outside surface 52 of the center tube section 50 along the second reference plane P2 that is perpendicular to the first reference plane P1, as viewed along in the direction of the center spindle axis A. The lengthwise dimension L is larger than the widthwise dimension W. This results in the outside surface 52 of the center tube section 50 having an oval cross section as taken along a section plane (i.e., section line 7-7) that is perpendicular to the center spindle axis A. Thus, this oval cross section of the outside surface 52 of the center tube section 50 has an overall transverse cross sectional shape that includes a first generally convex arc disposed on a first side of the second reference plane P2 and a second generally convex arc disposed on a second side of the second reference plane P2 as viewed along in a direction of the center spindle axis A. The first generally convex arc extends a majority of the outside surface 52 of the center tube section 50 on the first side of the second reference plane P2. The second generally convex arc extending a majority of the outside surface 52 of the center tube section 50 on the second side of the second reference plane P2.

If a prior art pedal were made with a pedal body that had a center tube section with equal widthwise and lengthwise dimensions of the center tube section, e.g., a circular cross section, and that had its widthwise dimension being the same as the widthwise dimension W of the center tube section 50, then a degree of stiffness of the center tube section 50 according to the pedal body 22 of this invention would be higher than that the prior art pedal body due to the pedal body 22 of this invention having the larger lengthwise dimension L. In other words, with the illustrated pedal body 22, the same degree of stiffness of the center tube section 50 can be attained by dimensioning the widthwise dimension W of the center tube section 50 to be smaller than a prior art's pedal body with a circular cross section of the center tube section having its widthwise dimension equal to the lengthwise dimension L of the center tube section 50 of the pedal body 22. As a result, the first through opening O1 and/or the second through opening O2 can be larger for the pedal body 22 of this invention than for prior art pedal bodies with the width and length dimensions of the center tube section being the same, while still maintaining a degree of stiffness of the center tube section 50 that is equal to or higher than such prior art pedal bodies.

More preferably, the outside surface 52 of the center tube section 50 has four quarters of the oval that are substantially symmetrical with respect to the first and second reference planes P1 and P2. These four quarters of the oval can be considered as first and second portions or quarters of the oval with respect to the first and second reference planes P1 and P2. In particular, the outside surface 52 of the center tube section 50 has a first portion or quarter of the oval located on a first side of the second reference plane P2, and a second portion or quarter of the oval located on a second side of the second reference plane P2, with the first and second portions or quarters of the oval being substantially symmetrical with respect to the first reference plane P1. Likewise, the outside surface 52 of the center tube section 50 has a first portion or quarter of the oval located on first side of the first reference plane P1, and a second portion or quarter of the oval located on a second side of the first reference plane P1, with the first and second portions or quarters of the oval being substantially symmetrical with respect to the second reference plane P2. These four quarters of the oval of the outside surface 52 of the center tube section 50 can also be considered as first and second surface parts with respect to the first and second reference planes P1 and P2. Moreover, the outside surface 52 of the center tube section 50 includes a first surface part or quarter of the oval extending from the first reference plane P1 to the second reference plane P2, and a second surface part or quarter of the oval extending from the first reference plane P1 to the second reference plane P2 with the first and second surface parts or quarters of the oval meeting at the second reference plane to form an apex along the second reference plane P2. As used herein, the term "generally oval" refers to an oval shape in which the overall shape is an oval that can be formed on one or more curved lines and/or straight lines. Similarly, as used herein, the term ""generally convex arc" refers to the convex arc shape in which the overall shape is an convex arc shapes that can be formed on one or more curved lines and/or straight lines. As used herein, the term "smooth" excludes sharp or abrupt surface changes such as two planar surfaces meeting together. However, the term "smooth" can include a curved surface meeting a planar surface so long as an abrupt transition does not occur between the curved surface and the planar surface.

The front cleat engagement members 24 are coupled to opposite ends of the pedal body 22 in substantially the same orientation as each other, but on opposite sides of the pedal body 22. One of the rear cleat engagement members 26 is pivotally coupled to first inner and outer side portions 41a and 41b of the pedal body 22 via one of the pivot pins 30, while the other cleat engagement member 26 is pivotally coupled to second inner and outer side portions 42a and 42b of the pedal body 22 via the other one of the pivot pins 30. Thus, the cleat engagement members 24 and 26 selectively engage the cleat 14 of the bicycle shoe 12 to attach the sole of the bicycle shoe 12 to the pedal 10B. The cleat engagement members 24 are preferably fixedly coupled to opposite ends of the pedal body 22, while the cleat engagement members 26 are preferably pivotally coupled to opposite ends of the pedal body 22 by the pivot pins 30.

As seen in FIG. 8, threaded through holes 68 are formed in flanges 41a and 42a for threadedly securing pivot pins 30 therein. Blind bores 70 are formed in flanges 41b and 42b for receiving the ends of pivot pins 30 therein. The biasing members 32 and the rear cleat engagement members 26 are mounted on the pivot pins 30 such that the rear cleat engagement members 26 are movable between a clamping position and a release position. The biasing members 32 engage cleat engagement members 26 such that the cleat engagement members 26 are normally biased toward the clamping position.

Referring to FIGS. 4 to 7, the front cleat engagement members 24 will now be discussed in more detail. Each of the cleat engagement members 24 is preferably a plate-shaped member formed of rigid metallic material, such as steel. As best seen in FIG. 4, each of the front cleat engagement members 24 is configured to form a portion of one of the first and second through opening O1 or O2, which allows mud to easily push therethrough via the cleat 14. Each of the front cleat engagement members 24 is preferably fixedly coupled to pedal body 22 by a plurality (three) of attachment bolts 28 as seen in FIG. 4. More specifically, as seen in FIG. 8, the pedal body 22 preferably has three threaded blind bores 72 on each of the sides of the pedal body 22 for receiving the attachment bolts 28. The threaded blind bores 72 extend substantially in a perpendicular direction to the first reference plane P1 of the pedal body 22. In other words, the threaded blind bores 52 have their axes substantially parallel.

Referring to FIG. 7, each of the cleat engagement members 24 includes a cleat engagement surface 74 facing the first reference plane P1 of the pedal body 22, and a curved front stop surface 76. Each of the cleat engagement surfaces 74 is spaced from opposite sides of the first reference plane P1 of the pedal body 22 and substantially parallel to the first reference plane P1 of the pedal body 22 to engage a portion of the cleat 14. The curved front stop surface 76 is perpendicularly arranged relative to the cleat engagement surface 74. The curved front stop surface 76 prevents forward movement of the cleat 14 relative to the pedal body 22, when the cleat 14 is engaged with one of the front cleat engagement members 24.

Referring now to FIGS. 4 to 7, each of the rear cleat engagement members 26 includes a rear cleat engagement surface 78 and a curved rear stop surface 80. The rear cleat engagement surface 78 faces in substantially the same direction as front cleat engagement surface 74. Preferably, the cleat engagement surface 78 is spaced from the first reference plane P1 of the pedal body 22 and faces toward the first reference plane P1 of the pedal body 22. Moreover, the cleat engagement surface 78 is preferably substantially parallel to the first reference plane P1 of the pedal body 22. The curved rear stop surface 80, which is arranged perpendicularly relative to the cleat engagement surface 78. The stop surface 80 prevents rearward movement of the cleat 14 relative to the pedal body 22, when the cleat 14 is engaged with one of the sets of front and rear cleat engagement members 24 and 26.

In coupling the cleat 14 to the bicycle pedal 10B, the rider steps onto the pedal body 22 which in turn causes one of the cleat engagement members 26 to rotate rearward and allow the cleat 14 to be coupled to the pedal body 22. Tension adjusting mechanisms 34 can be adjusted to vary the force required for inserting/releasing the shoe cleat 14 from the bicycle pedal 10B. More specifically, when attaching the rider's shoe to the bicycle pedal 10B through the cleat 14, the rider moves the shoe 12 downwardly and forwardly relative to the pedal body 22 such that the front end or nose portion of the cleat 14 engages one of the front cleat engagement members 24. Once the front end of the cleat 14 is engaged with one of the front cleat engagement members 24, the rider places the rear end of the cleat 14 in contact with one of the rear cleat engagement members 26. The rear end of the cleat 14 act as a cam which causes the rear cleat engagement member 26 to rotate. In this position, the rider presses the shoe 12 downwardly against the bicycle pedal 10B to cause the cleat engagement member 26 to initially pivot rearward against the force of one of the biasing members 32 to a cleat releasing position. The rear end of the cleat 14 then enters a position opposite of back face of one of the engagement portions 70 of one of the cleat engagement members 26. Then, the rear cleat engagement member 26 returns under the force of its respective one of the biasing members 32 so that the rear cleat engagement member 26 engages the rear end of cleat 14. This engagement fixes the rider's shoe to the pedal 10B via the cleat 14.

When releasing the shoe 12 from the pedal 10B, the rider will typically turn the shoe 12 about an axis perpendicular or approximately perpendicular to the reference plane P1 of the pedal body 22. As a result of this pivoting action, the cleat engagement member 26 is pivoted against the force of biasing member 32 to a cleat releasing position to release the shoe 12 from the pedal 10B.

Figure 10:
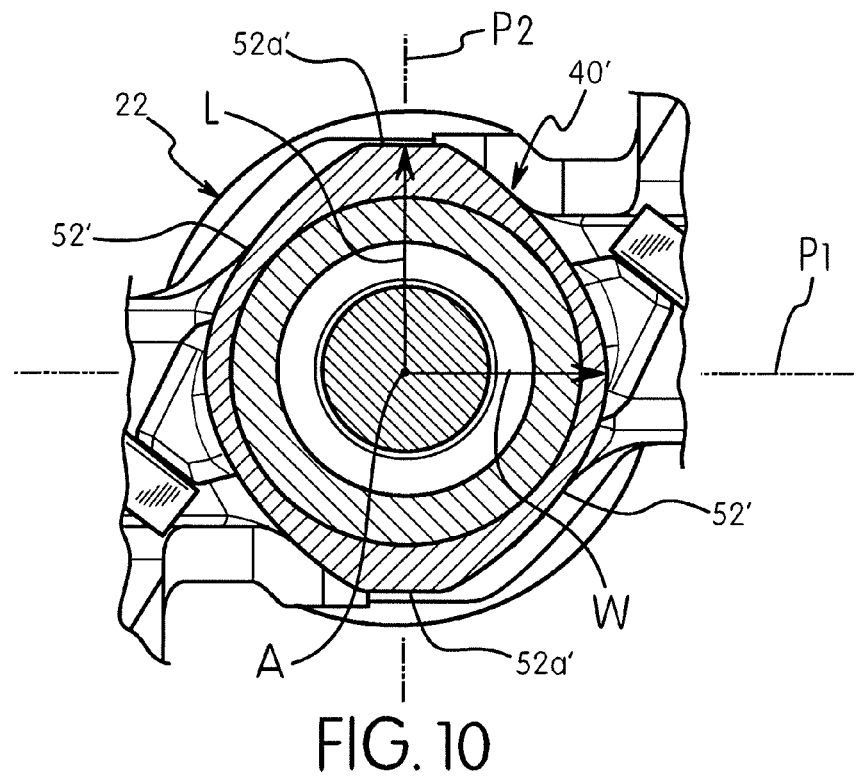
FIG. 10 is a first alternate, cross sectional view, similar to FIG. 9, of a tubular mounting portion that can be used in the pedal bodies illustrated in FIGS. 3 and 4.

Referring now to FIG. 10, a first alternate configuration of a tubular mounting portion 40' that can be used in the pedal bodies 22 illustrated in FIGS. 1 to 9 will now be explained. In other words, in this first alternate configuration, the remainder of the pedal body (not shown) is identical to the pedal body 22 of the first embodiment. In view of the similarity between the tubular mounting portion 40' of this first alternate configuration and the tubular mounting portion 40 of the first embodiment, only the tubular mounting portion 40'. Accordingly, the descriptions of the parts of the first alternate configuration that are identical to the parts of the first embodiment have been omitted for the sake of brevity.

Here in this first alternate configuration, the tubular mounting portion 40' has a center tube section with an outside surface 52' that includes a pair of flat surface parts 52a'. The flat surface parts 52a' are disposed between first and second generally convex arcs of the outside surface 52'. The flat surface parts 52a' intersect with the second reference plane P2, and is parallel to the first reference plane P1, with the remainder of the outside surface 52' forming two curved surface parts between the flat surface parts 52a'. Thus, the tubular mounting portion 40' has a generally oval cross section as taken along a section plane that is perpendicular to the center spindle axis A. In the case of a road pedal with only a single step-in cleat engagement structure, only the top half (i.e., above the first reference plane P1) needs to be formed with a flat surface part and two curved surface parts extending from the flat surface part towards the first reference plane P1 (i.e., the lower half can have other configurations).

Figure 11:
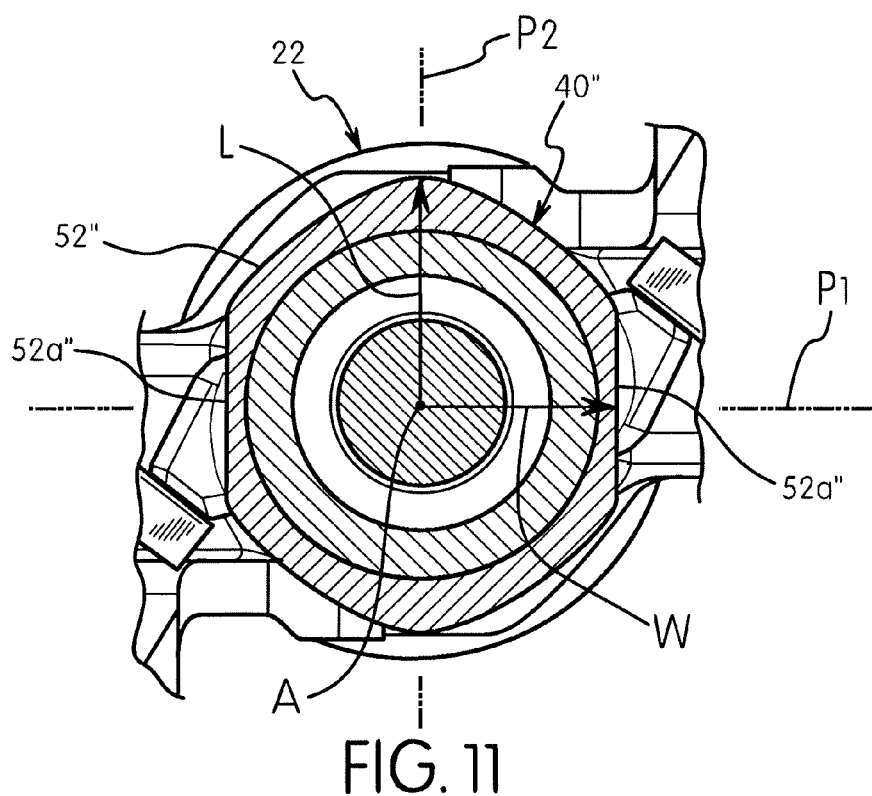
FIG. 11 is a second alternate, cross sectional view, similar to FIG. 9, of a tubular mounting portion that can be used in the pedal bodies illustrated in FIGS. 3 and 4.

Referring now to FIG. 11, a second alternate configuration of a tubular mounting portion 40" that can be used in the pedal bodies 22 illustrated in FIGS. 1 to 9 will now be explained. In other words, in this second alternate configuration, the remainder of the pedal body (not shown) is identical to the pedal body 22 of the first embodiment. In view of the similarity between the tubular mounting portion 40" of this second alternate configuration and the tubular mounting portion 40 of the first embodiment, only the tubular mounting portion 40" will now be explained. Accordingly, the descriptions of the parts of the second alternate configuration that are identical to the parts of the first embodiment have been omitted for the sake of brevity.

Here in this second alternate configuration, the tubular mounting portion 40" has a center tube section with an outside surface 52" that includes a pair of flat surface parts 52a". The flat surface parts 52a" are disposed between first and second generally convex arcs of the outside surface 52". The flat surface parts 52a" intersect with the first reference plane P1 and is parallel to the second reference plane P2, with the remainder of the outside surface 52' forming two curved surface parts between the flat surface parts 52a". Thus, the tubular mounting portion 40" has a generally oval cross section as taken along a section plane that is perpendicular to the center spindle axis A. In the case of a road pedal with only a single step-in cleat engagement structure, only the top half (i.e., above the first reference plane P1) needs to be formed with this configuration (i.e., the lower half can have other configurations).

Figure 12:
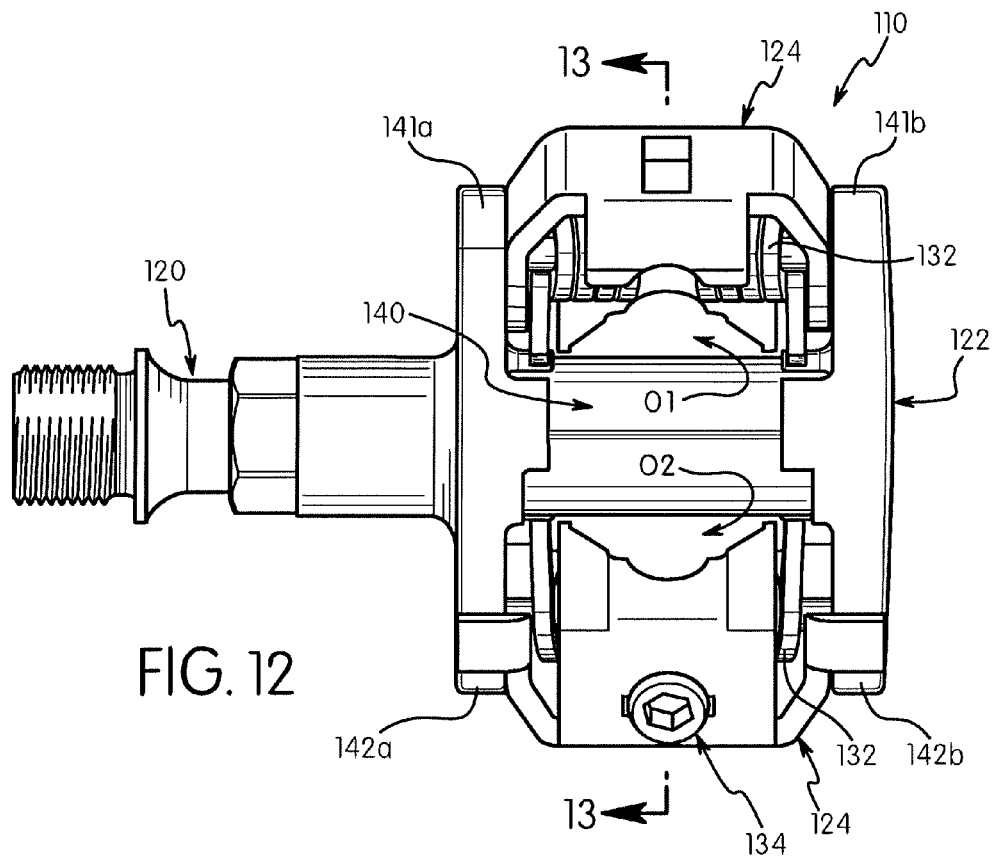
FIG. 12 is a top plan view of a right bicycle pedal in accordance with a second embodiment.
Figure 13:
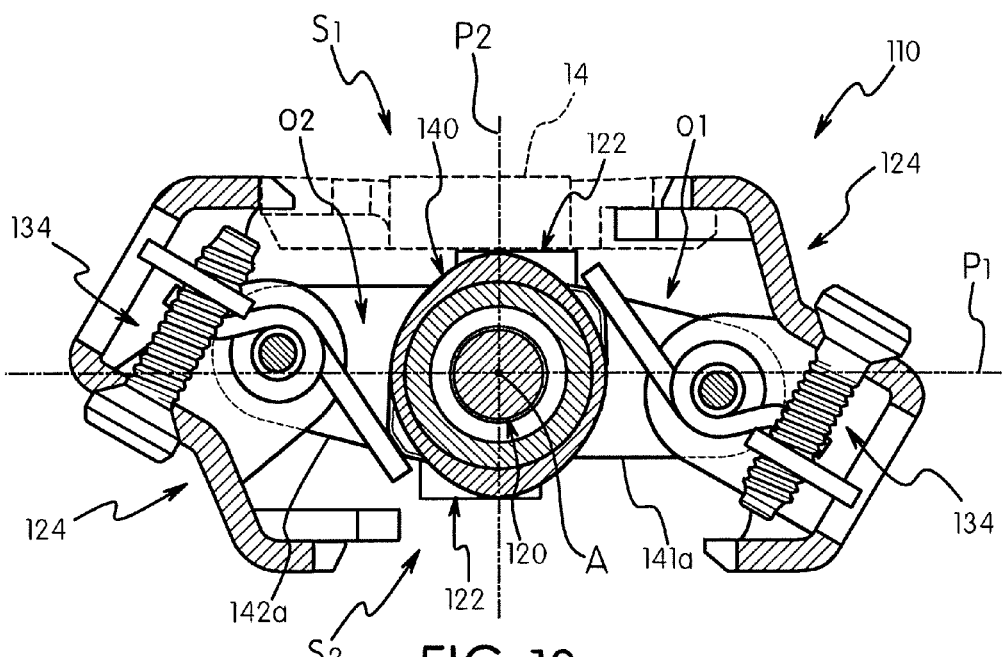
FIG. 13 is a longitudinal cross sectional view of the right bicycle pedal illustrated in FIG. 12 as seen along section line 13-13 of FIG. 12.

Referring now to FIGS. 12 and 13, a bicycle pedal 110 is illustrated in accordance with a second embodiment. In this embodiment, the bicycle pedal 110 mainly includes a pedal spindle or axle 120, a pedal body 122, a pair of cleat engagement members 124. The pedal body 122 has a tubular mounting portion 140, a first inner side portion or flange 141a, a first outer side portion or flange 141b, a second inner side portion or flange 142a and a second outer side portion or flange 142b. The bicycle pedal 110 differ from the pedals 10A and 10B in that the cleat engagement members 124 are both pivotally mounted to first and second shoe supporting parts of the pedal body 122, respectively, while in the pedals 10A and 10B, the front cleat engagement members 24 are non-movably fixed to the pedal body 22 and the rear cleat engagement members 26 are movably coupled to the pedal body 22. The cleat engagement members 124 are biased to a clamping position by biasing elements 132 with the biasing forces of the biasing elements 132 being adjustable by tension adjusting mechanisms 134. Here, each of the cleat engagement members 124 includes a front cleat engagement part and a rear cleat engagement part.

The pedal body 122 of the bicycle pedal 110 includes a tubular mounting portion 140 of the first embodiment for rotatably supporting the pedal spindle 120. As in the first embodiment, the tubular mounting portion 140 is spaced from first and second center portions (i.e., the engagement members 124) of the bicycle pedal 110 first and second through openings O1 and O2. The configuration of the tubular mounting portion 140 is identical to the configuration of the tubular mounting portion 40. Thus, a detailed discussion of the configuration of the tubular mounting portion 140 has been omitted for the sake of brevity.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle pedal. Accordingly, these terms, as utilized to describe the present invention should be interpreted relative to a bicycle equipped with the bicycle pedal as used in the normal riding position. Finally, terms of degree such as "substantially", "about", "generally" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
a pedal spindle with a center spindle axis; and
a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions,
the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure,
the tubular mounting portion including a center tube section partially defining the first through opening with respect to the first center portion of the first shoe supporting part and the second through opening with respect to the second center portion of the second shoe supporting part,
the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis,
the center tube section having a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension,
the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extending a majority of the outside surface of the center tube section on the first side of the second reference plane, and the second generally convex arc extending a majority of the outside surface of the center tube section on the second side of the second reference plane, the first generally convex arc and the second generally convex arc being substantially symmetrical with respect to the first reference plane.

2. A bicycle pedal comprising:
a pedal spindle with a center spindle axis; and
a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions,
the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure, the tubular mounting portion including a center tube section partially defining the first through opening with respect to the first center portion of the first shoe supporting part and the second through opening with respect to the second center portion of the second shoe supporting part, the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis, the center tube section having a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension, the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extending a majority of the outside surface of the center tube section on the first side of the second reference plane, and the second generally convex arc extending a majority of the outside surface of the center tube section on the second side of the second reference plane, the outside surface of the center tube section having a first portion located on a first side of the second reference plane, and a second portion located on a second side of the second reference plane, with the first portion and the second portion being substantially symmetrical with respect to the first reference plane.

3. A bicycle pedal comprising:

a pedal spindle with a center spindle axis; and a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions, the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure, the tubular mounting portion including a center tube section partially defining the first through opening with respect to the first center portion of the first shoe supporting part and the second through opening with respect to the second center portion of the second shoe supporting part, the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis, the center tube section having a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension, the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extend a majority of the outside surface of the center tube section on the first side of the second reference plane, and the second generally convex arc extending a majority of the outside surface of the center tube section on the second side of the second reference plane, the outside surface of the center tube section having a first portion located on first side of the first reference plane, and a second portion located on a second side of the first reference plane, with the first portion and the second portion being substantially symmetrical with respect to the second reference plane.

4. A bicycle pedal comprising:

a pedal spindle with a center spindle axis; and a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions, the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure, the tubular mounting portion including a center tube section partially defining the first through opening with respect to the first center portion of the first shoe supporting part and the second through opening with respect to the second center portion of the second shoe supporting part, the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis, the center tube section having a lengthwise dimension as measured from the center spindle axis to an outside surface of the center tube section along a second reference that is perpendicular to the first reference plane, as viewed along in the direction of the center spindle axis, with the lengthwise dimension being larger than the widthwise dimension, the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extending a majority of the outside surface of the center tube section on the first side of the second reference plane, and the second generally convex arc extending a majority of the outside surface of the center tube section on the second side of the second reference plane, the outside surface of the center tube section having a generally oval cross section as taken along a section plane that is perpendicular to the center spindle axis.

5. The bicycle pedal according to claim 1, wherein
the outside surface of the center tube section includes a first surface part of the first generally convex arc that extends from the first reference plane to the second reference plane, and the outside surface of the center tube section further includes a second surface part of the second generally convex arc that extends from the first reference plane to the second reference plane, with the first surface part and the second surface part meeting at the second reference plane to form an apex along the second reference plane.

6. The bicycle pedal according to claim 1, wherein
the outside surface of the center tube section has a flat surface part disposed between the first generally convex arc and the second generally convex arc.

7. The bicycle pedal according to claim 1, wherein
the outside surface of the center tube section includes a flat surface part intersecting with the second reference plane and parallel to the first reference plane, and the outside surface of the center tube section further includes a curved surface part extending from the flat surface part towards the first reference plane.

8. The bicycle pedal according to claim 1, wherein
the outside surface of the center tube section includes a flat surface part intersecting with the first reference plane and parallel to the second reference plane, and the outside surface of the center tube section further includes a curved surface part extending from the flat surface part towards the second reference plane.

9. A bicycle pedal comprising:
a pedal spindle with a center spindle axis; and
a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions,
the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure, the tubular mounting portion including a center tube section partially defining the first through opening with respect to the first center portion of the first shoe supporting part and the second through opening with respect to the second center portion of the second shoe supporting part, the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis, the center tube section having a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension, the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extending a majority of the outside surface of the center tube section on the first side of the second reference plane, and the second generally convex arc extending a majority of the outside surface of the center tube section on the second side of the second reference plane, the first cleat engagement member being non-movably fixed to the first shoe supporting part of the pedal body and the second cleat engagement member being movably coupled to the second shoe supporting part of the pedal body.

10. the bicycle pedal according to claim 9, wherein
the first center portion further includes a third engagement member movably fixed to the first shoe supporting part of the pedal body, and
the second center portion further includes a fourth cleat engagement member non-movably coupled to the second shoe supporting part of the pedal body, with the third cleat engagement member and the fourth cleat engagement member forming an additional step-in cleat engagement structure on an opposite side of the first plane from the first cleat engagement member and the second cleat engagement member.

11. The bicycle pedal according to claim 1, wherein
the first cleat engagement member and the second cleat engagement member are movably coupled to the first shoe supporting part and the second shoe supporting part of the pedal body respectively.

12. A bicycle pedal comprising:
a pedal spindle with a center spindle axis, and a pedal body including a tubular mounting portion rotatably mounted on the pedal spindle, a first shoe supporting part extending in a first direction from the tubular mounting portion and a second shoe supporting part extending in a second direction from the tubular mounting portion, with the first direction and the second direction being opposite directions, the first shoe supporting part and the second shoe supporting part including a first center portion and a second center portion, respectively, with the first center portion being spaced from the tubular mounting portion by a first through opening and the second center portion being spaced from the tubular mounting portion by a second through opening, the first center portion includes a first cleat engagement member supported by the first shoe supporting part, the second center portion includes a second cleat engagement member supported by the second shoe supporting part, with the first cleat engagement member and the second cleat engagement member forming a step-in cleat engagement structure, the tubular mounting portion including a center tube section partially defining the first through opening with respect to the first center portion of the first shoe supporting part and the second through opening with respect to the second center portion of the second shoe supporting part, the center tube section having a widthwise dimension as measured from the center spindle axis to an outside surface of the center tube section along a first reference plane that passes through the center spindle axis and that is substantially perpendicular to a cleat pedaling force direction applied to the pedal spindle, as viewed along in a direction of the center spindle axis, the center tube section having a lengthwise dimension as measured from the center spindle axis to an outside surface of the center tube section along a second reference plane that is perpendicular to the first reference plane, as viewed along in the direction of the center spindle axis, with the lengthwise dimension being larger than the widthwise dimension, the outside surface of the center tube section having an overall transverse cross sectional shape that includes a first generally convex arc disposed on a first side of the second reference plane and a second generally convex arc disposed on a second side of the second reference plane as viewed along in a direction of the center spindle axis, with the first generally convex arc extending a majority of the outside surface of the center tube section on the first side of the second reference plane, and the second generally convex arc extending a majority of the outside surface of the center tube section on the second side of the second reference plane, the first center portion further including a third cleat engagement member supported by the first shoe supporting part, and the second center portion further including a fourth cleat engagement member supported by the second shoe supporting part, with the third cleat engagement member and the fourth cleat engagement member forming an additional step-in cleat engagement structure on an opposite side of the first plane from the first cleat engagement member and the second cleat engagement member.

\* \* \* \* \*